United States Patent [19]

Balthazar et al.

[11] Patent Number: 5,179,232
[45] Date of Patent: Jan. 12, 1993

[54] PROCESS FOR SOLUBILIZING FORMALDEHYDE OLIGOMERS

[75] Inventors: Edward J. Balthazar, Sissonville, W. Va.; Harold E. Bellis, Wilmington, Del.; Charles J. Denham, Charleston, W. Va.

[73] Assignee: E. I. Du Pont de Nemours and Company, Wilmington, Del.

[21] Appl. No.: 631,109

[22] Filed: Dec. 19, 1990

[51] Int. Cl.$^5$ .................. C07C 51/367; C07C 59/01
[52] U.S. Cl. .................................. 562/587; 562/517
[58] Field of Search .............................. 562/587

[56] References Cited

U.S. PATENT DOCUMENTS

| | | | |
|---|---|---|---|
| 2,686,797 | 8/1954 | Bersworth | 562/587 |
| 3,870,749 | 3/1975 | Danesh | 562/587 |

OTHER PUBLICATIONS

Tomasino et al, Textile Chemist and Colorist, 16(12) pp. 33-38, Dec. 1984.

Primary Examiner—Vivian Garner

[57] ABSTRACT

A process for solubilizing solid formaldehyde oligomers without contaminating the solution product with undesirable solvent products by treating the oligomer with heated hydroxyacetic acid.

6 Claims, No Drawings

PROCESS FOR SOLUBILIZING FORMALDEHYDE OLIGOMERS

BACKGROUND OF THE INVENTION

This invention relates to a process for solubilizing low molecular weight formaldehyde oligomers of 6-100 carbon atoms without contaminating the solution product with undesirable by-products of formaldehyde or the solvent. The resultant solution can be used in the production of hydroxyacetic acid (HAA), or the formaldehyde can be distilled from the mixture for reuse.

Formaldehyde has for years been produced and shipped as a 35-60% aqueous solution. Usually a minor amount of a stabilizer such as a polythiol is added. Freshly prepared formaldehyde is low molecular weight and soluble. However, on standing formaldehyde polymerizes to insoluble forms that resist dissolution. These insoluble forms are oligomers of 6 to as many as 100 carbon atoms. These polymers are tough and resistant solids that can foul heat exchanger surfaces, pumps and distillation columns, causing periodic shut-downs and dismantling to clean the production equipment. Also the formaldehyde may polymerize and solidify in the bottom of storage tanks and in shipment, resulting in loss of the shipping container as well as the formaldehyde product. Complete rail tank cars of formaldehyde may solidify.

Heating molecules of up to 5 carbon atoms will dissolve them, but molecules of 6 or more carbon atoms cannot be dissolved by simple heating. Heretofore it has been the practice to chip out the solid, but this is ineffective with process equipment and small tanks. Alternatively, caustic or ammonium hydroxide has been used to dissolve the oligomer. This technique gives a non-usable solvent-contaminated solution of high volume that cannot be incinerated because of salt content, or the ammonium prevents discharge to a waste water treatment plant. The use of HAA in accordance with the present invention allows the use of both of these waste disposal methods if desired..

Formic acid has also been used to solubilize paraform, but its corrosiveness to production equipment greatly limits its use. See German Patents 2,652,072; 2,652,003; and 2,741,505 to Hoechst A.G.

Walker ("Formaldehyde", ACS Monograph Series, Reinhold Publishing Corp., 1964, p. 153) states that strong acids will dissolve formaldehyde but pH's of 2-6 are ineffective. Thus, the effectiveness of HAA is surprising.

SUMMARY OF THE INVENTION

A rapid economical process has been discovered for depolymerizing and solubilizing solidified formaldehyde oligomers to yield a solution that, with minimum cleanup, can be used directly in production of a high value product. This process avoids the generation of significant quantities of waste, destruction of containers, and production equipment dismantling.

Specifically, the process of this invention comprises heating solidified formaldehyde oligomers containing 6-100 carbon atoms in contact with hydroxyacetic acid. While the mechanism is not completely understood, it apparently depends upon the fact that acid degrades polyether randomly and thereby reduces the molecular weight rapidly. In any event the oligomers are depolymerized and could react with HAA to form the formaldehyde/HAA hemiacetal, as shown in Equation I:

Eq. I: $(H_2O)_6$—100
$+ CH_2OHCOOH \rightarrow HOCH_2OCH_2$—COOH.

The product, with little or no purification can be converted to HAA simply by reacting the mixture with molar equivalent amounts of $H_2O$ and CO.

Some purification may be required for the solubilized product. This will, of course, depend primarily on the extent and nature of contamination of the oligomer. For example, it may be necessary to flash off MeOH and/or excess water; strip or extract formic acid; treat with an ion exchange resin or charcoal; and/or filter out solids.

Another advantage of the present invention is the low heat of reaction during dissolution with HAA. This is particularly desirable to avoid overheating and forming decomposition products.

In practice, solubilizing will be carried out by subjecting the solid oligomer, such as a heel in a tank or even coated equipment, to HAA solution in at least a 1:1 weight ratio of HAA:($CH_2O$), and preferably at least a 3:1 ratio. This can be done batchwise, or continuously by pumping heated HAA into a vessel containing polymer and pumping solution out. Alternatively, live steam can be injected into a vessel containing polymer and HAA.

Solubilization time, of course, depends on the geometry (surface area) of the oligomer, the temperature, and other factors. Time in the range of 15 minutes to several days is normal. A temperature of at least 50° C. is needed to effect solubilization in a reasonable time. Temperatures over about 120° C. have little advantage. Agitation or circulation of the solution speeds solubilization. The HAA solution concentration is not critical, and may be as low as 5% HAA aqueous solution. In practice, 30-70% solutions are used. Conveniently, production grade 70% HAA aqueous solution is used to minimize water in recycle use.

It has also been found that lactic acid in its various stereo isomer forms, like HAA, is an excellent solubilizing agent for these normally insoluble formaldehyde oligomers.

EXAMPLE 1

Tests were run with various solubilizing candidates at a variety of conditions of solvent/formaldehyde ratios, temperatures and times to observe the solvents capability to solubilize typical solid formaldehyde oligomer containing 6-100 ($CH_2O$) units in the oligomer chains. The tests were conducted by putting about 25 g samples of the white waxy solid in a beaker, adding the indicated solvent and heating the beaker at the temperatures and times indicated. Results are shown in Table 1.

TABLE I

| Test # | Solvent | Solvent/Oligomer Weight Ratios | Time/Temp. | Solubilizing |
|---|---|---|---|---|
| 1 | 70% HAA | 3 | 30 min./80° C. | some |
| 2 | 55% HAA | 3 | 30 min./80° C. | some |
| 3 | 5% HAA | 3 | 30 min./80° C. | none |
| 4 | $H_2O$ | 3 | 30 min./80° C. | none |
| 5 | MeOH | 3 | 30 min./80° C. | none |
| 6 | 10% NaOH | 3 | 30 min./80° C. | 100%[a] |
| 7 | Dimethyl-acetamide | 3 | 30 min./80° C. | none |
| 8 | 44% For- | 3 | 30 min./80° C. | some |

TABLE I-continued

| Test # | Solvent | Solvent/Oligomer Weight Ratios | Time/Temp. | Solubilizing |
|---|---|---|---|---|
| 9 | 70% HAA mic Acid | 3 | 30 min. 80° C. plus 30 min. 100° C. | 100% |
| 10 | 55% HAA | 3 | 30 min. 80° C. plus 30 min. 100° C. | 100% |
| 11 | 5% HAA | 3 | 30 min. 80° C. plus 30 min. 100° C. | 100% |
| 12 | H$_2$O | 3 | 30 min. 80° C. plus 30 min. 100° C. | none |
| 13 | MeOH | 3 | 30 min. 80° C. plus 30 min. 100° C. | none |
| 14 | 10% NaOH | 3 | 30 min. 80° C. plus 30 min. 100° C. | 100%[a] |
| 15 | Dimethyl-acetamide | 3 | 30 min. 80° C. plus 30 min. 100° C. | none |
| 16 | 44% Formic Acid | 3 | 30 min. 80° C. plus 30 min. 100° C. | 100% |
| 17 | 70% HAA | 1 | 30 min/94° C. | some |
| 18 | 5% HAA | 1 | 30 min/94° C. | none |
| 19 | H$_2$O | 1 | 30 min/94° C. | none |
| 20 | 10% NaOH | 1 | 30 min/94° C. | some[a] |
| 21 | 70% HAA | 0.5 | 30 min/94° C. | some |
| 22 | 5% HAA | 0.5 | 30 min/94° C. | none |
| 23 | H$_2$O | 0.5 | 30 min/94° C. | none |
| 24 | 10% NaOH | 0.5 | 30 min/94° C. | some[a] |
| 25 | 70% HAA | 1 | 60 min/94° C. | 100% |
| 26 | 5% HAA | 1 | 60 min/94° C. | some |
| 27 | H$_2$O | 1 | 60 min/94° C. | none |
| 28 | 10% NaOH | 1 | 60 min/94° C. | 100%[a] |
| 29 | 70% HAA | 0.5 | 60 min/94° C. | some |
| 30 | 5% HAA | 0.5 | 60 min/94° C. | none |
| 31 | H$_2$O | 0.5 | 60 min/94° C. | none |
| 32 | 10% NaOH | 0.5 | 60 min/94° C. | 100%[a] |
| 33 | 70% HAA | 1 | 30 min/105° C. | 100% |
| 34 | 5% HAA | 1 | 30 min/105° C. | 100% |
| 35 | H$_2$O | 1 | 30 min/105° C. | none |
| 36 | 10% NaOH | 1 | 30 min/105° C. | 100%[a] |
| 37 | 70% HAA | 0.5 | 30 min/105° C. | 100%[b] |
| 38 | 5% HAA | 0.5 | 30 min/105° C. | some[b] |
| 39 | H$_2$O | 0.5 | 30 min/105° C. | none |
| 40 | 10% NaOH | 0.5 | 30 min/105° C. | 100%[a][b] |

[a] The NaOH solutions were orange because NaOH causes formaldehyde degradation or complexing to sugars which carmelize.
[b] Became cloudy on standing at room temperature. In tests 1–40 the formaldehyde oligomer molecules contain 6–100 carbon atoms.

EXAMPLE 2

A stainless steel absorber and cooler used in formaldehyde manufacture was effectively cleaned from deposited formaldehyde solid oligomers by passing 35% HAA down the column at 50° C., with steam injection. The unit was clean in 4 hours.

EXAMPLE 3

A 17,000 gal. storage tank had a heel of 1,000 gal. solidified oligomer bottoms. Using a 3/1 ratio of HAA to oligomer and circulating the HAA at 50° C., the heel residue was dissolved in 2 days with periodic removal of liquid. A portion of the resultant liquid was used without incident to make HAA of standard quality.

EXAMPLE 4

A storage tank containing 120,000 pounds of solidified oligomer of 6–100 carbon atoms was cleaned as in Example 3. The solid block of oligomer was converted to a white slurry which was periodically removed. This slurry was acceptable for treating in a waste water treatment plant. The addition of more HAA to a portion of the slurry resulted in dissolution of the slurry to a clear solution.

EXAMPLE 5

A portion of the HAA/oligomer solution prepared as in Example 3 is distilled. High purity formaldehyde is recovered, which contains no significant HAA contamination.

EXAMPLE 6

During the production of 55% formaldehyde solution, a portion of oligomer molecules of 6 or more carbon atoms is inadvertently formed. This product is scrubbed with 50% HAA, which absorbs substantially all of these higher molecular weight oligomers.

What is claimed:

1. A process for solubilizing a solidified formaldehyde oligomer containing from 6–100 carbon atoms comprising contacting the oligomer at an elevated temperature of at least about 50° C. with hydroxyacetic acid in a weight ratio of hydroxyacetic acid to oligomer of at least 1:1.

2. The process of claim 1 wherein the hydroxyacetic acid is in the form an an aqueous solution containing at least 5% hydroxyacetic acid.

3. The process of claim 1 wherein the contacting time is at least 15 minutes.

4. The process of claim 1 wherein the hydorxyacetic acid is in the form of an aqueous solution containing at least 50% hydroxyacetic acid.

5. The process of claim 1 wherein steam is used in achieving the elevated temperature.

6. The process of claim 1 wherein the product is a slurry.

* * * * *